Figure 1:
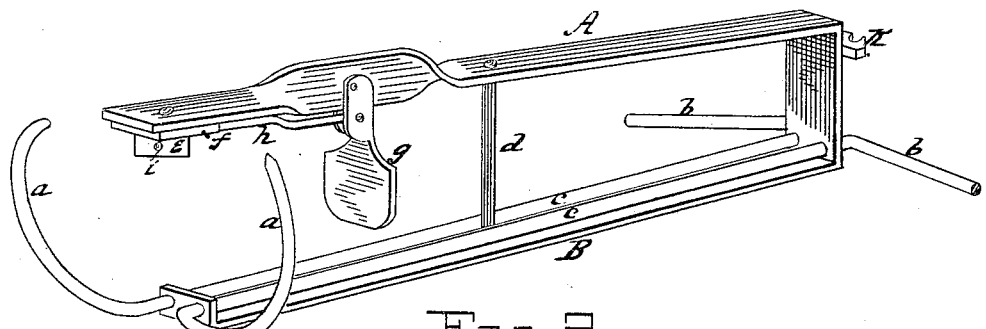

(No Model.)  J. BEAN.  2 Sheets—Sheet 1.

ANIMAL TRAP.

No. 353,657.  Patented Dec. 7, 1886.

WITNESSES:
Edwin L. Bradford
A. W. Featman

INVENTOR.
John Bean,
By Toulmin & Kummer
his Attys (No Model.) 2 Sheets—Sheet 2.

J. BEAN.
ANIMAL TRAP.

No. 353,657. Patented Dec. 7, 1886.

UNITED STATES PATENT OFFICE.

JOHN BEAN, OF LOS GATOS, CALIFORNIA.

ANIMAL-TRAP.

SPECIFICATION forming part of Letters Patent No. 353,657, dated December 7, 1886.

Application filed October 29, 1885. Serial No. 181,261. (No model.)

*To all whom it may concern:*

Be it known that I, JOHN BEAN, a citizen of the United States, residing at Los Gatos, in the county of Santa Clara and State of California, have invented certain new and useful Improvements in Animal-Traps, of which the following is a specification, reference being had therein to the accompanying drawings.

My invention relates to an improvement in animal-traps, and is especially adapted to that class of animals that burrow in the ground—such as gophers, prairie-dogs, and the like. The gopher is an exceedingly cunning little animal, and is possessed of a peculiarly sharp scent, being able to detect even the simple handling of the trap, and will instinctively shun it. It is therefore very difficult to entrap him in the traps heretofore in use, which have been so constructed that it was necessary to set the trap before placing it in the ground or in the animal's runway, and in most cases being necessary to handle the triggers and other operative parts of the trap, thus leaving the scent of the hands on it, and as a consequence the animal would most likely avoid the trap. Another difficulty arising from traps thus set before placing in the ground is that it requires great care in placing it in position to prevent springing the trap; and this necessary precaution precludes the possibility of sufficiently embedding the trap in the ground to hide it from view, and leaving it exposed is fatal to its efficiency, as the wary little animal is too cunning to be caught by any unsightly and dangerous looking device that may be obstructing his pathway, and more especially is this the case when his acute sense of smell detects the fact that some possible enemy has been plotting for his destruction by placing the ugly-looking thing in his pathway. In order therefore to successfully entrap him, it is absolutely necessary to employ a device that may be placed in position and set without the necessity of bringing the hands in contact with the operative portions of the trap, and, furthermore, it must be concealed from view and offer no obstruction to the passage-way of the animal. This cannot be done with traps as ordinarily constructed, for the reasons already stated, viz: first, the operative parts of the trap must be handled more or less; second, the trap must be set before placing it in the ground, and when set it is necessary to handle it with so much caution to prevent springing that it is impossible to properly conceal it with dirt. It is therefore a valuable and important feature of my invention that the trap is adapted to be placed in the ground before it is set, thereby not only avoiding the necessity of handling the trap, in order to prevent detection by the animal, but also to avoid all liability of accident or injury to the operator, it being thus set without coming in contact with any of the dangerous parts of the trap; and, furthermore, it is adapted to be thoroughly concealed in the dirt before setting, and when so concealed the dirt in no way interferes with the operation or efficiency of the trap.

Another important feature of my invention is that when the trap has been sprung and the animal caught the trap may be removed from the ground, the animal released, the trap replaced and reset without touching or handling the part of it that is placed in the ground, and which does the work.

The construction and operation of my device will be more readily understood by reference to the accompanying drawings, which are made a part of this specification.

Figure 2:
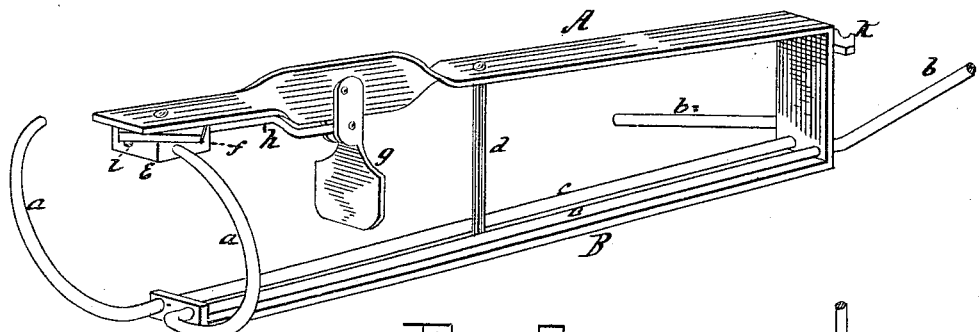
Figure 3:
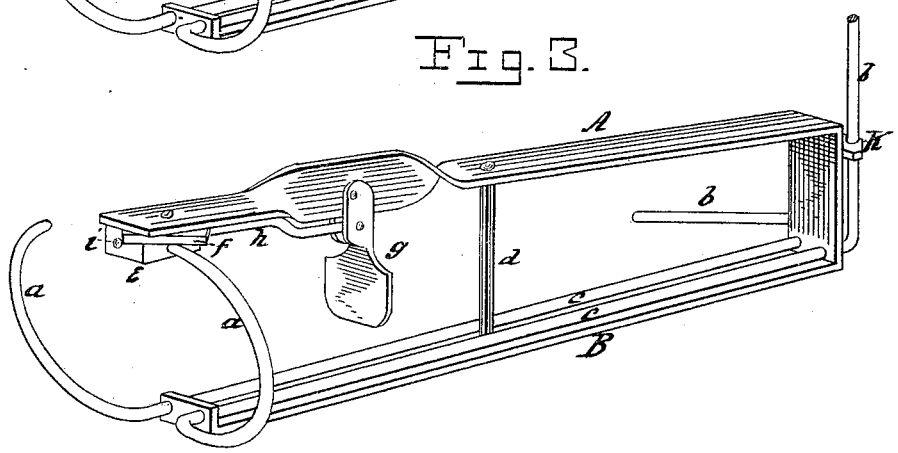
Figure 4:
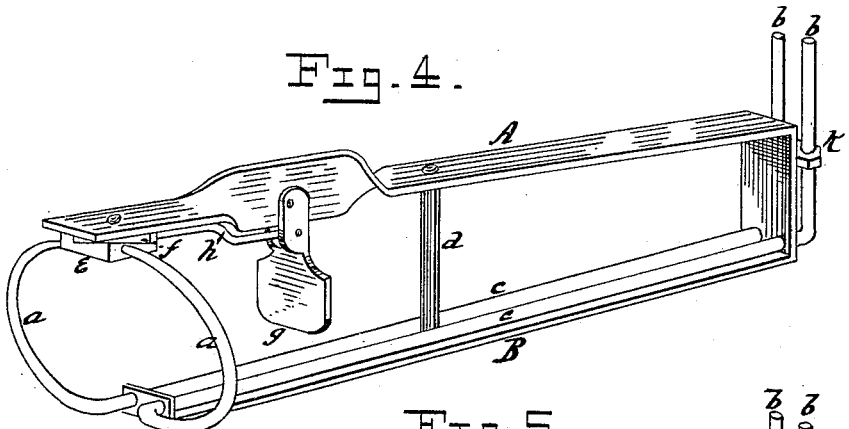
Figure 5:
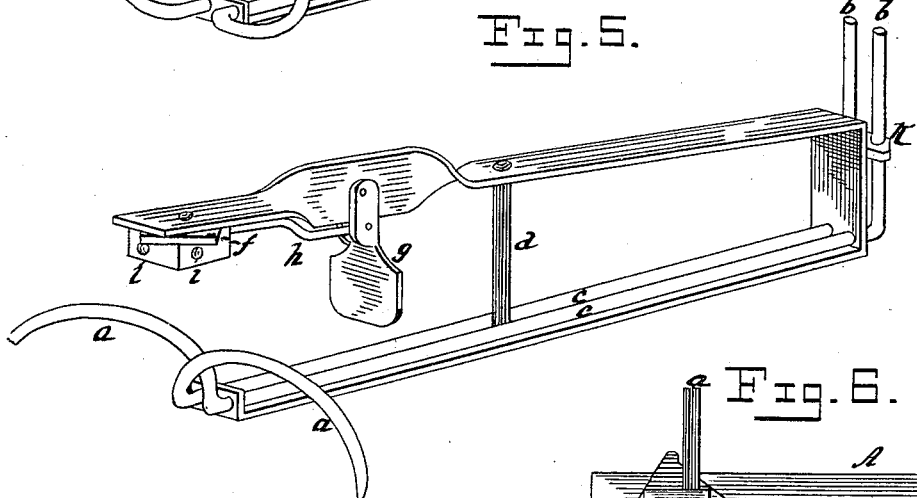
Figure 6:
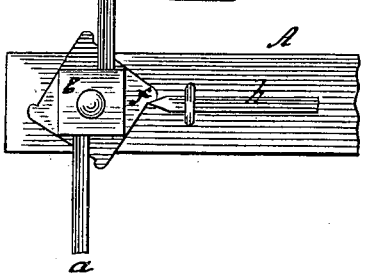
Figure 7:
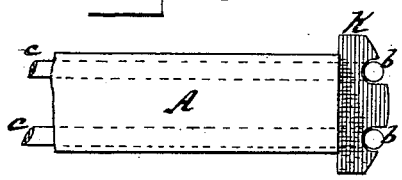

Figure 1 represents the trap-sprung and adapted to permit the release of the animal. Fig. 2 represents the trap before setting and about to be placed in the ground. Fig. 3 represents the trap with one jaw or hook set and the other open. Fig. 4 represents the trap set and in position for catching the animal. Fig. 5 represents the trap after having been sprung and in position to hold the game. Fig. 6 is an inverted plan view of a section of the upper plate of the trap, with the rotating catch and a portion of the trigger attached thereto and a section of each jaw or hook, showing their relative positions to each other when the trap is set. Fig. 7 is a plan view of a section of the rear portion of the trap, showing the springs and the notched plate holding them in position.

The several parts of my invention are, for the purpose of convenience, designated by letter as follows, viz:

A indicates the upper plate of the trap; B, the lower plate; *a a*, the jaws or hooked portions of the springs; $c\ c$ the springs proper; $b\ b$, that portion of the spring-wire that extends through the rear part of the trap, and is so bent as to serve as levers to apply the necessary torsional strain to produce the desired spring, and to hold the springs in position for service. $d$ is the connecting rod or rivet; $e$, the portion of the rotating catch that is adapted to engage with the jaws or hooks; $f$, the rim or flange of the same; $g$, the pendent plate or trencher; $h$, the trigger; $i\ i\ i\ i$, the countersinks in the sides of the rotating catch $e$; $k$, notch-plate on rear end of trap adapted to hold levers $b\ b$ in place.

The upper and lower plates, A B, of my trap may be made in separate pieces, if desired, and fastened together by any suitable means; but from preference I construct the whole frame of one piece by bending it into the form desired. The forward end of the lower plate, B, is turned up sufficiently to admit of perforations adapted to receive and hold the springs $c\ c$, the rear part of the frame being also perforated to receive and hold the rear portion of the springs. A section of the upper plate is from preference twisted for the purpose of affording a convenient and efficient method of attaching the pendent plate or trencher $g$. The upper and lower plates, A B, are held firmly together by the rod or rivet $d$. The springs $c\ c$ are from preference made of two separate pieces of wire bent in the form shown and described. I do not, however, confine myself to this specific construction, as other methods of construction may be employed and a similar result attained—viz., the jaws or hooks $a\ a$ and springs $c\ c$ might be made in one piece and levers $b\ b$ dispensed with and the trap set by taking hold of the jaws $a\ a$ and forcing them back into position and slipping their points into the countersinks in rotating catch $e$; or the jaws and springs may be made in two pieces, as now, with levers $b\ b$ cut off and the ends of the springs firmly secured in the rear part of the trap, and the trap set in the manner above described; or one jaw or hook may be stationary and the other one operative. The jaws or hooks may also be made in different forms; but none of the various constructions described would be as desirable or possess all the advantages of the construction shown and described. I therefore prefer and adopt the latter.

In following out this method of construction the wires are first bent to form the jaws or hooks $a\ a$. They are then slipped into the perforations in the lower plate, and that portion of the wires that extends through the rear end of the trap is bent to form the levers $b\ b$. By reference to Fig. 2 it will be observed that the relative positions to each other of jaw $a$ and lever $b$ is such that when the former is in position with its point resting against rotating catch $e$, and before the torsional strain is applied to spring $c$, lever $b$ stands at about an angle of thirty degrees. This angle may, however, be varied to suit the purposes required for producing a greater or less degree of torsional strain upon the spring, thus producing a stronger or milder spring, as may be desired.

From the foregoing description of the construction of the spring and the position of the jaw and lever, as shown in Fig. 2, it will be readily understood that when lever $b$ is turned up to a vertical position, as shown in Fig. 3, a great torsional strain is applied to spring $c$, thus adapting it to act as a quick and powerful spring. The points of the jaws $a\ a$ are slightly rounded or pointed and adapted to fit in corresponding countersinks, $i$, which are provided on the four sides of the rotating catch $e$. The catch $e$ is preferably constructed of a square piece of any suitable material, having a projecting rim or flange, $f$, which is likewise square; but instead of its sides running parallel with the sides of $e$, the lines cross each other at an angle of about forty-five degrees, as shown in Fig. 6. The four corners of flange $f$ are each provided with a slight projection or lug adapted to engage with trigger $h$, which serves to hold the catch from revolving, thereby keeping the trap set. This construction will be readily understood by reference to Fig. 6. The jaws or hooks $a\ a$ are so formed that they will pass each other in opposite directions, as shown in Figs. 5 and 6. The rotating catch $e$, with its flange $f$, is secured to the under side of plate A by means of a suitable rivet or other device, which serves as a pivot about which catch $e$ revolves loosely. The countersinks in the sides of catch $e$ are so located as that when the points of the opposing jaws or hooks $a\ a$ are inserted into them, and the trap is set, as shown in Fig. 6, the jaws $a\ a$ point and press in opposite directions in lines running parallel with each other, but on opposite sides of the pivotal center of catch $e$. The pendent trencher $g$ is loosely pivoted to plate A in such manner as to be in nearly a vertical position when the trap is set for use. The trigger $h$ is pivoted loosely to the trencher $g$ in such manner that a slight backward movement of the trencher will draw the trigger back sufficiently to disengage it from the lug on the corner of flange $f$. When thus freed, the powerful pressure of the jaws $a\ a$ in opposite directions will cause the rotating catch $e$ to instantly revolve by means of the torsional strain on springs $c\ c$. The jaws passing each other in opposite directions, as shown in Fig. 5, will securely hold the animal.

When it is desired to set the trap, the operator takes hold of the rear end of the trap at levers $b\ b$, and slightly lowers the front end, which will cause the pendent trencher $g$ to swing forward. This movement carries the trigger $h$ forward until its point engages with the edge of the rim $f$ of the rotating catch $e$. The operator then elevates levers $b\ b$ (one at a time) to a vertical position, and secures them in notch-plate $k$, as shown in Fig. 4; and the trap is set.

It will be observed that catch e always revolves in the same direction, no matter which jaw is brought in contact with it first, the construction being such that both jaws tend to turn it the same way. It will also be observed that the trap cannot be set until the trigger engages with the lug or corner of flange f; hence the necessity of elevating the rear end of the trap, in order to throw the trencher forward and cause the trigger to engage with it. In order to insure the trigger catching and holding, it is important that the movement of catch or lug on flange f be slow as it approaches the point of the trigger, and to insure this feature I construct the catch e with its flange f in the manner shown and described. The flange f might be a circular disk, with notches or projections adapted to engage with the trigger; but from experience I prefer the construction shown and described as one of importance.

As has already been explained, the trap is adapted to be set after it is placed in position. Consequently the operator first finds the hole or runway of the animal. He then thrusts the forward end of the trap into the hole as far as desired, then taking hold of levers b b presses them outward to the right and left, thus pressing jaws a a back, in order to provide room for them to operate, then by working the trap backward and forward slightly the loose dirt is caused to fall over the trap sufficiently to conceal it. He then brings the levers b b up to a vertical position and secures them in the notch-plate k, as shown in Fig. 4, and the trap is set.

It will be observed that the way is clear for the animal as he approaches the trap until he comes in contact with the pendent trencher g, the slightest backward movement of which springs the trap in the manner already described, and the animal is firmly held between the jaws a a.

Having thus fully described my invention, what I claim is—

1. In an animal-trap, the combination, with the frame carrying a rotating catch, a trigger, and a trencher for releasing the catch, of the jaws mounted in the frame and engaging opposite sides of the catch, and constructed to grasp the animal when the trencher is disturbed.

2. In an animal-trap, the combination, with the frame thereof and a torsional spring constructed with a grasping-jaw at one end and a lever at the other, of a portion co-operating with the jaw to grasp the animal.

3. In an animal-trap, the combination, with the frame and the rotating catch mounted thereon, of the jaws placed slightly out of line with each other, the torsional springs secured to the jaws and the levers secured to the springs and adapted to engage the frame, and a releasing device for freeing the catch.

4. In an animal-trap, the torsional springs bent at the forward ends to form jaws, and means for holding said springs under tension, in combination with a catch for holding the jaws set, a trigger, and a trencher.

5. In an animal-trap, the combination, with the jaws, of the rotating catch having countersinks on its several sides adapted to be engaged by the jaws, said catch being provided with a flange of larger diameter than the body of the catch, said flange having lugs on its several corners, with which a trigger engages, for the purpose set forth.

6. In an animal-trap, the combination, with a frame carrying a trigger, of a trencher for releasing the catch, the jaws mounted in the frame and engaging with said catch, and setting-levers connected with said jaws and located some distance from them, whereby, when the trap is placed in a burrow, the animal in coming out meets the jaws before reaching the levers.

7. In an animal-trap, the combination, with the frame and the rotating catch having a flange, the trigger, and the trencher, all mounted upon the frame, of torsional springs, the jaws formed on one end and the setting-levers formed on the other end, substantially as described.

In testimony whereof I affix my signature in presence of two witnesses.

JOHN BEAN.

Witnesses:
G. R. REED,
L. C. TRAILER.